(12) United States Patent
Bodnar, Jr. et al.

(10) Patent No.: US 8,674,534 B2
(45) Date of Patent: Mar. 18, 2014

(54) MANAGED PNEUMATIC TURBINE POWER SUPPLY

(76) Inventors: Paul V. Bodnar, Jr., Tequesta, FL (US); James Sottile, Southbridge, MA (US)

( * ) Notice: Subject to any disclaimer, the term of this patent is extended or adjusted under 35 U.S.C. 154(b) by 219 days.

(21) Appl. No.: 13/152,721

(22) Filed: Jun. 3, 2011

(65) Prior Publication Data

US 2012/0306218 A1 Dec. 6, 2012

(51) Int. Cl.
*F03B 13/00* (2006.01)
*F03B 13/10* (2006.01)
*H02P 9/04* (2006.01)

(52) U.S. Cl.
USPC .......................................................... 290/43

(58) Field of Classification Search
USPC ................ 290/43, 52, 44, 54, 55, 40 A–40 D
See application file for complete search history.

(56) References Cited

U.S. PATENT DOCUMENTS

| | | | |
|---|---|---|---|
| 2,558,592 A * | 6/1951 | Starkey et al. | 290/2 |
| 3,898,439 A * | 8/1975 | Reed et al. | 700/287 |
| 4,041,470 A | 8/1977 | Slane et al. | |
| 5,267,473 A | 12/1993 | Bezos et al. | |
| 5,374,015 A | 12/1994 | Bezos et al. | |
| 5,377,938 A | 1/1995 | Bezos et al. | |
| 5,507,457 A | 4/1996 | Kull | |
| 5,873,638 A | 2/1999 | Bezos | |
| 6,036,282 A | 3/2000 | Clarke et al. | |
| 6,087,950 A | 7/2000 | Capan | |
| 6,102,491 A | 8/2000 | Bezos | |
| 6,107,692 A | 8/2000 | Egri et al. | |
| 6,184,798 B1 | 2/2001 | Egri | |
| 6,236,185 B1 | 5/2001 | Hines et al. | |
| 6,322,025 B1 | 11/2001 | Colbert et al. | |
| 6,839,664 B1 | 1/2005 | Kull | |
| 7,096,096 B2 | 8/2006 | Kane et al. | |
| 7,467,032 B2 | 12/2008 | Kane et al. | |
| 7,468,564 B2 | 12/2008 | Crisafulli | |
| 7,728,464 B2 | 6/2010 | Leininger | |
| 7,742,850 B2 | 6/2010 | Kane et al. | |
| 7,770,525 B2 | 8/2010 | Kumar et al. | |
| 7,872,591 B2 | 1/2011 | Kane et al. | |

\* cited by examiner

*Primary Examiner* — Javaid Nasri
(74) *Attorney, Agent, or Firm* — McHale & Slavin, P.A.

(57) ABSTRACT

A pneumatic turbine power supply including a pneumatic turbine, a rectifier circuit for converting the AC power output by the pneumatic turbine to DC power, a voltage regulator for maintaining a constant voltage and a battery. The pneumatic turbine further provides a rotor blade containing a disc with magnets that are turned between a plurality of stator windings, the turning caused by a leakage that engages the rotor blades, the leakage from the emergency air brake reservoir found on rolling stock. The pneumatic turbine power supply further provides DC power output to both a device and a battery. The pneumatic turbine may operate despite a loss of pneumatic air pressure found in the brake pipe of the rolling stock.

9 Claims, 2 Drawing Sheets

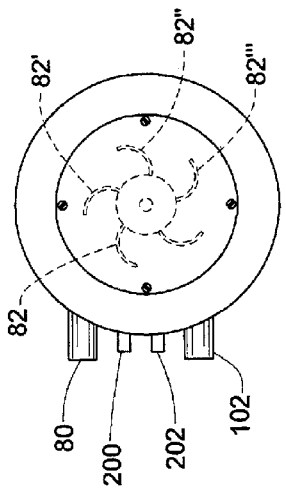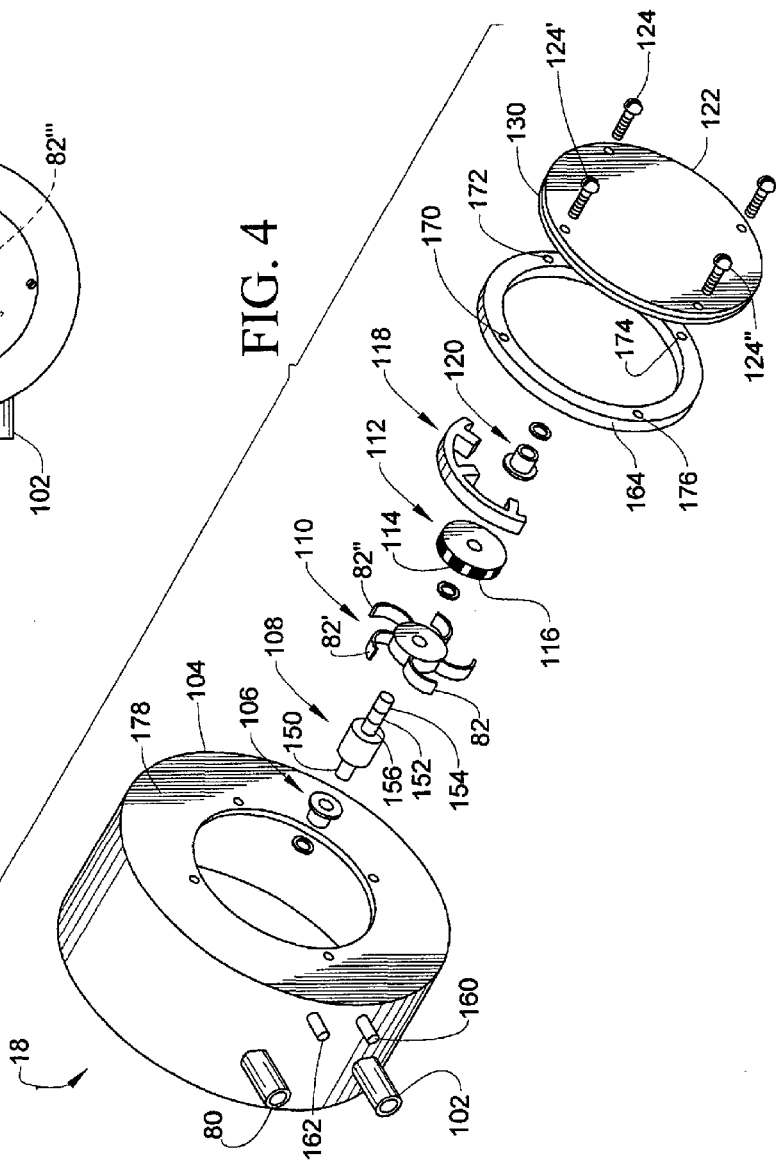

MANAGED PNEUMATIC TURBINE POWER SUPPLY

FIELD OF THE INVENTION

This invention is related to the field portable power supplies and more particularly to a managed power supply drawing from the reserve section of a train based compressed air storage tank, with an automatic shut off based upon battery condition.

BACKGROUND OF THE INVENTION

The most common type of train brake uses compressed air to force a pad against a wheel for braking purposes. The compressed air is supplied by a motor driven air compressor typically located on the locomotive, the compressed air is stored in at least one main reservoir located on the locomotive. Doors, whistles, traction control systems, automatic couplers and window wipers are all mechanical devices which can be operated by compressed air. Air pressure is normally supplied in a range of between 90 and 140 psi and delivered along the length of the trail by an air brake line.

The brake pipe can also be used to replenish reservoirs that are located on separate vehicles that make up a multi-car train. If a single compressor is used time has to be allowed between successive applications for the reservoirs to recharge. Also, the air brake system does not have a partial release capability. Once the brakes are released, the brakes can only be reapplied when the reservoir pressure has recharged to a value higher than the brake cylinder pressure.

A multiple unit train may have two or more compressors located under suitable cars which will supply air to the train through the main reservoir pipe. The operation of the compressors will usually be synchronised via a control wire linked to the compressor governors so that they all operate in unison. Further, compressed air reservoirs may be located under suitable cars providing an air supply to an individual car. A distributor is used on each vehicle to monitor the pressure in the brake pipe. When brake pipe pressure falls, the distributor allows air from the reservoir to pass to the brake cylinders to apply the brake. When brake pipe pressure rises, the distributor releases the air from the brake cylinder and recharges the reservoir for the next application.

A brake release valve is provided on each vehicle in a train and allows the brake to be released manually on that vehicle. Sometimes operated by a lever mounted in a suitable location for access by the crew or in some applications the valve can be operated remotely. Some versions have a bleed hole on a brake isolating cock which performs the same function if it is necessary to isolate the brakes of one car from the rest of the train.

The traditional air brake works well in the hands of a skilled driver but it has a number of shortcomings. The control system relies on the changes in brake pipe pressure to control the application and release of the brakes. This means that a command by the driver to alter the pressure is felt by the front of the train first and then gradually by the rest of the train until it reaches the end. To the novice driver, improper application of the brakes can cause problems during release when leading vehicles in release mode can pull on rearmost vehicles which still have brakes applied.

Electro-pneumatic brake systems have been designed so that they can be added to the traditional air brake system to allow more rapid responses to the driver's braking commands. When an application is called for at one end, the valve opens the brake pipe at the other end so that both ends are exhausting air at the same time. A simple version of this, called an (End of Train device) is used on US freight trains for emergency application.

A basic electro-pneumatic brake system comprises an electrically operated "holding valve" and "application valve" on each car together with control wires running the length of the train. The main reservoir is also connected to each car on the train by a brake pipe. Usually, each vehicle has a compressed air reservoir for the brakes. The electro-pneumatic brake operates independently of the air brake. It uses main reservoir air instead of brake pipe air and the air brake is kept in the release position. The brake is controlled from the same driver's brake valve as the air brake but using new positions to apply and release the brake. Electrical connections attached to the driver's brake valve send commands along the train to the holding and application valves on each car.

The advantage of the electro-pneumatic brake system is that it allows instantaneous reaction on all cars at the same time and it allows small and graduated applications and releases. Electro-pneumatic brakes are not normally used on freight trains because of the diversity of vehicles and the problem of getting an electric signal to transmit at a low voltage down a very long train. Radio control has been suggested, as has fitting each car with a battery.

A pneumatic turbine power supply used to provide electric power for operation of circuitry in an area that a conventional power supply may not be available. The pneumatic turbine has been found to be beneficial in supplying DC power to the End-Of-Train ("EOT") units. The pneumatic turbines are constructed to provide various voltages powered only with free air delivered from the locomotive and transmitted through the air brake pipe.

A problem that exists with the use of a conventional pneumatic turbine power supply that is coupled to an air brake pipe is that once the air brake pipe line is disconnected or fails, the pneumatic turbine becomes inoperative. If the air brake includes a main reservoir, once the main reservoir exhausts then it is only a matter of time until the pneumatic turbine power supply fails. For example when engaging the braking system an amount of air is consumed. Further, sitting idly in a rail yard may exhaust a reservoir if a conventional pneumatic turbine power supply continues to drawn air or the rolling stock bleed rod is opened.

In a patent disclosure, a battery can be coupled to the turbine to extend the life of the electrical output of the air turbine. However, coupling a battery to a pneumatic turbine does not solve the problem of exhaustion of the air compression in a train's air brake line because the battery may quickly fade if has not been maintained and is not recharged.

There are also many situations that would benefit from a reliable power supply. In particular rolling stock including railcars, box cars, coal cars and could include numerous sensors capable of relying internal and external environment conditions, brake operation, bearing condition, physical location, and so forth.

The prior art references, cited infra, use various systems and methods of implementing a pneumatic turbine based upon compressed air. However, there exists a need for a power supply that can adapted for use on any rolling stock but also provides a means for managing the power supply so that power can provided over an extremely long period of time even if the compressed air supply is not replenished. The instant managed pneumatic turbine power supply system makes it possible to install a multitude of electronic devices and sensors such as gps tracking, cargo temperature sensors, brake sensors, bearing sensors, and so forth to monitor the condition of rolling stock wherein the data obtained can be received by use of wifi, radio frequency, satellite and so forth.

DESCRIPTION OF THE PRIOR ART

U.S. Pat. No. 6,236,185, discloses a self-charging continuous power supply/battery pack that operates from excess air pressure available in a train's air system. An electric generator is driven by compressed air from the locomotive that is transmitted through the air brake system of the train. The generated electricity is input to a circuit card assembly that regulates the output voltage and generator speed. The regulated voltage is supplied to EOT electronics and also to a storage battery to recharge the storage battery, which provides peak operating power as well as back-up power if the generating system is inoperable. This disclosure fails to teach the use of shut off valve and securement to the reserve section of the reservoir.

U.S. Pat. No. 5,267,473, discloses a power supply in which an electrical generator driven by air from the train air brake pipe provides the primary power to an EOT unit. The power supply of this invention may be incorporated as part of the EOT unit or it may be supplied as a power kit modification for existing EOT units in order to replace electric storage batteries in these units.

U.S. Pat. No. 7,468,564, discloses an electrical power supply system comprising an air-powered alternating current electrical generator in which pressurized air from a single source is used to drive an air turbine secured on the shaft of the alternating current electrical generator. One uncontrolled nozzle continuously directs air from the single source to the air turbine. At least a second controlled nozzle directs air from the single source. A solenoid-controlled shut-off valve is placed in a conduit between the source of compressed air and the second nozzle.

U.S. Pat. No. 7,770,525, discloses a system which provides for segregating an energy storage system from at least one of at least one air pipe and at least one electric cable of a hybrid energy vehicle. The energy storage system includes at least one energy storage device and at least one hybrid cable. The system includes a pair of first regions proximately positioned below a respective pair of walkways extending along opposing sides of the vehicle, and a second region positioned between the pair of first regions. The energy storage system and at least one of the at least one air pipe and at least one electric cable are respectively positioned within one of the pair of first regions and the second region to segregate the energy storage system from at least one of the at least one air pipe and at least one electric cable of the hybrid energy vehicle.

U.S. Pat. No. 6,107,692, discloses a system for powering at least one of electronic devices or a battery includes a pneumatic supply source and an accumulator for storing a collected amount of the pneumatic supply. A pneumatically powered generator is connected to the accumulator for generating power upon receipt of the pneumatic supply. The generator is further connected to at least one electronic device and a battery. A microprocessor controls a storage amount of pneumatic supply within the accumulator, determines an output of the pneumatic supply to the generator, and applies an electrical output of the generator to at least one electronic device, a battery, or both an electronic device and a battery. The pneumatically powered generator is an electromagnetic generator having a rotor cavity separated by a wall of the generator housing from a stator and related magnetic disc. An inlet of the generator housing directs air at the rotor, thereby turning a common shaft of the rotor and the magnetic disc until a current is produced in windings of the stator. The current output from the stator windings is used to power peripheral devices including a chargeable battery and at least one electronic device if needed.

U.S. Pat. No. 6,036,282, discloses an electrical power generating system for a railcar to provide power for electrically driven accessories on the railcar which includes a generator driven by an air motor, wherein free air to the air motor is derived from air operating the braking system on the railcar, and particularly air that is exhausted to the atmosphere during braking operations.

U.S. Pat. No. 7,728,464, discloses a rotor for a pneumatic tool having electricity-generating capabilities comprises a shaft and an integral rotor body. The rotor body includes recesses dimensioned to receive an insulated subassembly comprising a magnet received within a nonmagnetic insulator. The nonmagnetic insulator acts to allow flux to be concentrated against stator windings. The improved rotor can be fitted with the insulated subassemblies in order to cooperate with a stator in the tool to generate electricity upon rotation of the rotor when pressurized fluid is applied to the vanes. A ring stator is supportable by a nonmagnetic end plate of the pneumatic tool, is disposed between the rotor and the rotor bearing and is preferably formed of Silicon Core Iron "B-FM" and magnet wire.

U.S. Pat. No. 5,374,015, discloses improvements relating to railroad telemetry and control system address problems in compatibility between HOT and EOT units, implement an automatic UDE location procedure, and automate calibration of EOT units. An improved two way protocol that allows EOT units having different code formats to be used with a HOT unit. A method is implemented by a HOT unit, cooperating with an EOT unit, for locating a fault which causes a UDE brake operation. An automatic calibration procedure for the EOT unit that does not require the operator to have access to the electronic circuitry.

SUMMARY OF THE INVENTION

The present invention relates to a managed pneumatic turbine power supply system that outputs electric current, continuing to output electric current in the event of a loss of pneumatic pressure in the pneumatic brake pipe line, for use on rolling stock where rolling stock includes railcars, box cars, coal cars and all other locomotives, both powered and unpowered vehicles. In particular, the present invention pneumatic turbine allows for continued power output by use of a pneumatic turbine placed in fluid communication with a reserve portion of a reservoir, and the use of shutoff valve controlled by battery conditioning.

Rolling stock may or may not be left in railroad yards with the pneumatic brake pipes filled with pressure. Nonetheless, rolling stock pneumatic reservoirs typically contain a main reservoir and a reserve reservoir, and that reserve reservoir commonly contains pneumatic pressure for at least twelve (12) to twenty-four (24) hours when idly sitting in the railroad yards. The instant invention takes advantage of the fact that the pressurized reservoir section of the pneumatic reservoir is more likely to contain pressure when the railcar sits motionlessly in the railroad yard or any outlying point than is the pneumatic brake pipe line or the main reservoir. When a train enters a yard the engineer will typically place the entire rolling stock in the emergency brake position. This leaves pneumatic pressure in the reserve reservoir only. Subsequently the car department employees manually releases each rolling stock of its reserve reservoir PSI whereby each rolling stock becomes a free-roller which is ideal for selectively assembling a new train configuration chosen from various rolling stock. The air brake system is charged with pneumatic pressure and tested once the new train configuration is assembled.

In addition to rolling stock left in the yard, rolling stock may be found at out-lying points. Rolling stock may be left at out-lying points because of business downturn or seasonal cycles e.g. automobile bi-level rail cars may be stored because auto production ceased for change-over models; too grain hopper cars may be stored until the growing season begins or ends or both. The rolling stock found at out-lying points may be close to a solid one hundred thirty (130) individual rolling stocks that take considerable room on railroad track and would congest the yard. Therefore, the rolling stock may be stored at the passing sidings along the main line.

Resultantly, the instant invention provides a new system and method for producing power output from a pneumatic turbine power supply on a railcar utilizing pneumatic pressure from an reserve section of the pneumatic reservoir which is unaffected by a drop in pressure from the pneumatic brake pipe line. The instant invention is particularly useful when the rolling stock is in the yard or at an out-lying point because the pneumatic brake lines and main pneumatic reservoir has been exhausted of its pneumatic pressure.

It is an objective of the present invention to provide a system for outputting current to at least one electronic device and charging at least one backup battery.

It is another objective of the present invention to provide a managed pneumatic turbine power supply system that utilizes air drawn from the reserve section of a pneumatic reservoir to rotate a rotor, the rotor turns a shaft that turns a magnetic disc. The magnetic disc containing a plurality of magnets that pass stator windings causing a magnetic field and a resultant power output.

It is an objective of the present invention to provide a managed pneumatic turbine power supply system that utilizes a flow of pneumatic pressure from a second pneumatic reservoir to rotate a rotor.

It is yet another objective of the present invention to provide a pneumatic control member for controlling the pneumatic flow capable of exhausting from the reserve section of the pneumatic reservoir.

It is an objective of the present invention to provide a portable pneumatic power supply apparatus fitted for use between ships, rolling stock and tractor-trailers.

It is yet another objective of the present invention to provide a portable pneumatic power supply apparatus capable of fitting with a portable reservoir bottle having an additional valve for an interim charge.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

These and other details of the present invention will be described in connection with the accompanying drawings, which are furnished only by way of illustration and not in limitation of the invention, and in which drawings:

FIG. 3 is a side of the pneumatic turbine assembly.

FIG. 4 is an exploded view of the pneumatic turbine assembly.

DETAILED DESCRIPTION OF THE INVENTION

Figure 1:
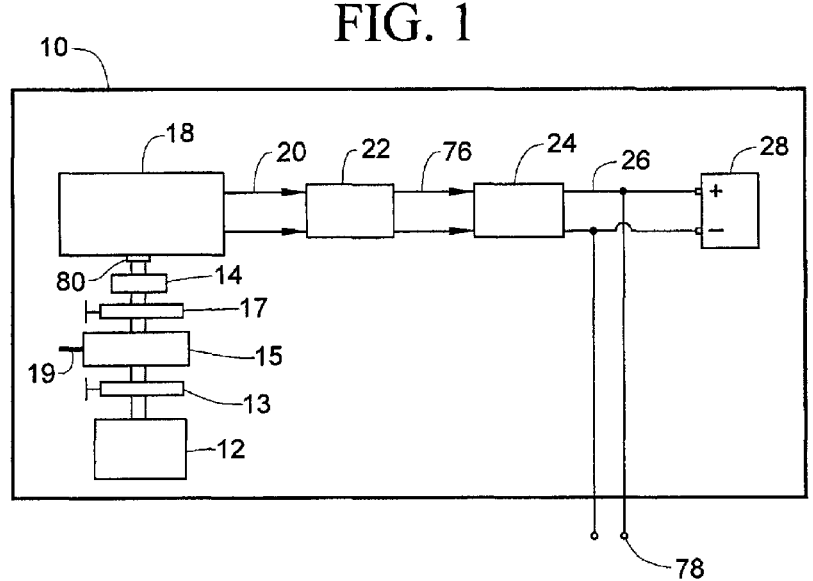
FIG. 1 illustrates the block diagram of a pneumatic power supply.
Figure 2:
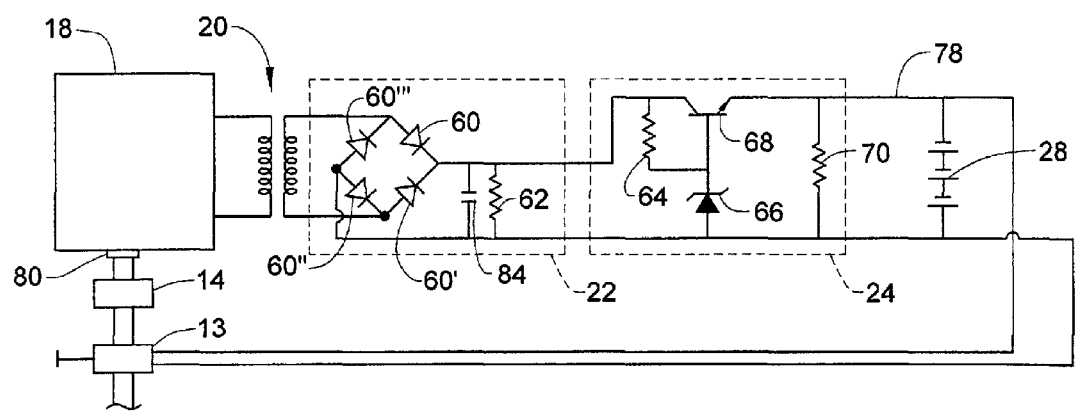
FIG. 2 illustrates the rectifier circuit and the voltage regulator circuit.

The present invention relates to a preferred embodiment of a pneumatic turbine for powering a device and a battery. While the present invention is susceptible of embodiment in various forms, there is shown in the drawings and will hereinafter be described as presently preferred, albeit not limiting, embodiment with the understanding that the present disclosure is to be considered an exemplification of the present invention and is not intended to limit the invention to the specific embodiments illustrated.

As shown in FIG. 1, is a managed pneumatic turbine power supply system 10 for outputting power 26 to an electric device comprising of a pneumatic turbine 18, a rectifier circuit 22, a voltage regulator circuit 24, a battery 28 and a pneumatic control member 13. The pneumatic turbine 18 adaptively receives a gentle exhaust from the reserve section of the pneumatic reservoir output 12 being found on rolling stock where rolling stock may include railcars, box cars, coal cars and all other train cars and locomotives, both powered and unpowered vehicles.

Furthermore, the pneumatic turbine power supply system 10 may be portably moved between ships, rolling stock, tractor-trailers and a flatbed trucks. When the pneumatic turbine power supply system 10 is placed on transportation other than rolling stock, the pneumatic turbine power supply system may 18 adaptively receive a gentle exhaust from a pneumatic source other than the reserve section of a pneumatic reservoir found on rolling stock.

An air filter 14 may exist between the pneumatic turbine 18 and the reserve section of the pneumatic reservoir output 12. Additionally, a pneumatic control member 13, such as a solenoid, may close off the draw from the reserve section of the pneumatic reservoir output 12 positioned between the pneumatic turbine 18 and the reserve section of the pneumatic reservoir output 12. The close off of the draw may occur when the battery 28 has reached a specific milestone, such as maximum charge. In order to protect the braking integrity of the rolling stock, the close off of the draw may additionally occur when the reserve section of the pneumatic reservoir has been called upon to supply pneumatic pressure to the main section of the pneumatic reservoir.

In one embodiment, a second pneumatic reservoir 15 capable of capturing and storing the pneumatic air supply from the reserve section of the pneumatic reservoir may exist between the pneumatic turbine 18 and the reserve section of the pneumatic reservoir output 12. In this case, the second pneumatic reservoir would then supply the gentle exhaust to the pneumatic turbine. Additionally, a second pneumatic control member 17 may close off the draw from the pneumatic reservoir 15 being positioned between the pneumatic turbine 18 and the second pneumatic reservoir 15.

The second pneumatic reservoir 15 may include a valve 19 about the body of the second pneumatic reservoir 15 for accepting pneumatic pressure from a second pneumatic source 21. The valve 19 may be similar to valve found on a bicycle tire or a car tire.

Furthermore, the second pneumatic reservoir 15 may be capable of disengagement from the reserve section of the reservoir. That disengagement may cause the pneumatic control member 13 to close in order to preserve the pneumatic pressure contained within the second pneumatic reservoir 15.

The draw from the reserve section of the pneumatic reservoir output 12 does not affect the safety of a pneumatic brake system and pneumatic pressure is replenishable by an equalizer valve. The pneumatic turbine 18 supplies an AC voltage 20 to a rectifier circuit 22. The rectifier circuit 22 receives the AC voltage 20 and outputs DC voltage 76. The DC voltage 76 is electrically received by a voltage regulator 24 designed to maintain a constant voltage level output 26. The voltage output 78 is electrically received by at least one device and at least one battery 28.

The pneumatic turbine 18 includes a means 80 to couple said pneumatic input to a reserve section of the pneumatic reservoir. The pneumatic turbine 18 has at least one rotor blade element 82 rotatably supported capable of producing a current. The rotor blade element 82 has a magnetic disc 112 made of positive members 114 and negative members 116 that creates a magnetic field when the magnetic portions pass a plurality of stator windings located on the housing of the rotor blade element 82 resultantly outputting an AC voltage 20 to the rectifier circuit 22.

The managed pneumatic turbine 18 may produce between 0.5 to 24 volts. The managed pneumatic turbine 18 may be a minimum of about 25 rpm based upon substantially 0.0083 Cubic Feet Per Minute at least a minimum of 1 Pressure Per Square Inch.

The system includes a pressure sensor switch 23 which may trigger an alarm when the pneumatic pressure drops below the minimum 1 PSI occurs or within an hour of a dead battery state. The alarm output member 25 is capable of producing light, noise, or an output signal such as an RF signal.

The rectifier circuit 22 is comprised of an AC voltage 20, a plurality of diodes 60, 60', 60", 60'" arranged to convert the AC voltage periodically reversing direction to flow in only one direction, a smoothing capacitor 84 and a resistor 62 configured to produce a direct current resulting output waveform 76.

A voltage regulator 24 is arranged to accept direct current 76, outputting a more constant voltage to at least one electronic device 78 and to a battery 28. The battery 28 is capable of supplying at least one electronic device a constant voltage in the event that the reserve section of the pneumatic reservoir is depleted to a point where said rotor blade 82 is no longer capable of being propelled by said reserve section of the pneumatic reservoir output 12.

The pneumatic turbine 18 may be housed in a casing made substantially of metal or plastic. The casing 104 may be formed to receive a securable side section 122 being secured by at least one screw member 124. The side section 122 and the casing 104 sandwich an air tight fitting material causing pneumatic pressure to only enter through the pneumatic input 80 and the pneumatic output 102. The rotor 110 is made up of a plurality of rotor blades 126 which rotate when a pneumatic pressure passes in through the pneumatic input 80 and flows out through the pneumatic output 102. The magnetic disc 112 is secured to a portion 152 of an elongated shaft 108, the cylindrical top portion of the magnetic disc 112 being covered in a plurality of positively charge magnets 114 and a plurality of negatively charged magnets 116 where each magnet is directly between two magnets of opposite charge. The rotor 110 is rotatably secured on an elongated shaft 108. The elongated shaft 108 is suspended in place by a first end cap 106 and a second end cap 120. The first end cap 106 and the second end cap 120 fit securably against the pneumatic turbine casing 104 and the securable side section 122, respectively. A member 164 is placed between the rotor 110 and the magnetic disc 112, having a hole that the elongated shaft passes through, having a portion of the elongated shaft 156 passing through the hole. The member lip portion 210 having a first hole 170, a second hole 172, a third hole 174, and a fourth hole 176 that allows a securing member 124 to pass through and secure to the receiving portion 178 of the case 104. A member with stator windings 118 is secured to the casing 104 between a member 164 and the securable side section 122.

What is claimed is:

1. A managed pneumatic turbine power supply system comprising:
   a turbine member having a pneumatic input fluidly coupled to a reserve section of a compressed air reservoir, said turbine member having at least one rotor blade element rotatably supported therein;
   a rectifier circuit constructed and arranged to produce electrical power when said rotor blade is rotated;
   a voltage regulator conditioning said electrical power produced by said rectifier circuit into a constant voltage;
   a battery for storing said electrical power having the constant voltage conditioned by said voltage regulator maintaining said battery at an predetermined optimum level; and
   a pneumatic control member positioned between said turbine member and said reserve section of said compressed air reservoir, said pneumatic control member electrically coupled to said voltage regulator for closing the compressed air supply thereby disabling the turbine member when said battery is at the optimum level;
   whereby said battery provides electrical power at a constant voltage for use in powering electronic devices and said battery is maintained at an optimum efficiency by management of the compressed air supply.

2. The managed pneumatic turbine power supply system of claim 1 wherein said compressed air is drawn from a reserve section of said compressed air reservoir wherein said solenoid positioning in combination with said voltage regulator allows for a continuous drawn of the draw of compressed air wherein the reserve section of said compressed air reservoir maintains sufficient air pressure to support a primary function of said reserve section to permit brake release.

3. The managed pneumatic turbine power supply system of claim 1 including a second pneumatic reservoir capable of one way capturing and storing compressed air from either a main or said reserve section of said compressed air reservoir, wherein said second pneumatic reservoir supplies pneumatic pressure to said turbine member if said reserve section of said compressed air reservoir is not available or is unable to hold the compressed air.

4. The managed pneumatic turbine power supply system of claim 3 wherein said second pneumatic reservoir includes a valve member for receipt of compressed air.

5. The managed pneumatic turbine power supply system of claim 1 wherein said voltage is between 0.5 volts and 25 volts.

6. The managed pneumatic turbine power supply system of claim 1, wherein said rotor blade element is rotated at a minimum of about 25 rpm based upon substantially 0.0083 Cubic Feet Per Minute at least a minimum of 1 Pressure Per Square Inch.

7. The managed pneumatic turbine power supply system of claim 1 wherein rotation of said rotor blade element produces AC electrical power to said rectifier and said rectifier converts the AC electrical power to DC electrical power.

8. The managed pneumatic turbine power supply system of claim 1 including a pressure sensor switch to signal an alarm condition when compressed air reservoir pressure drops below 1 psi.

9. The managed pneumatic turbine power supply system of claim 1 including an alarm to indicate when the battery state is within one hour of a dead battery state.

\* \* \* \* \*